(No Model.)
E. B. BARNHILL.
FERTILIZER DISTRIBUTER.
No. 541,417.  Patented June 18, 1895.
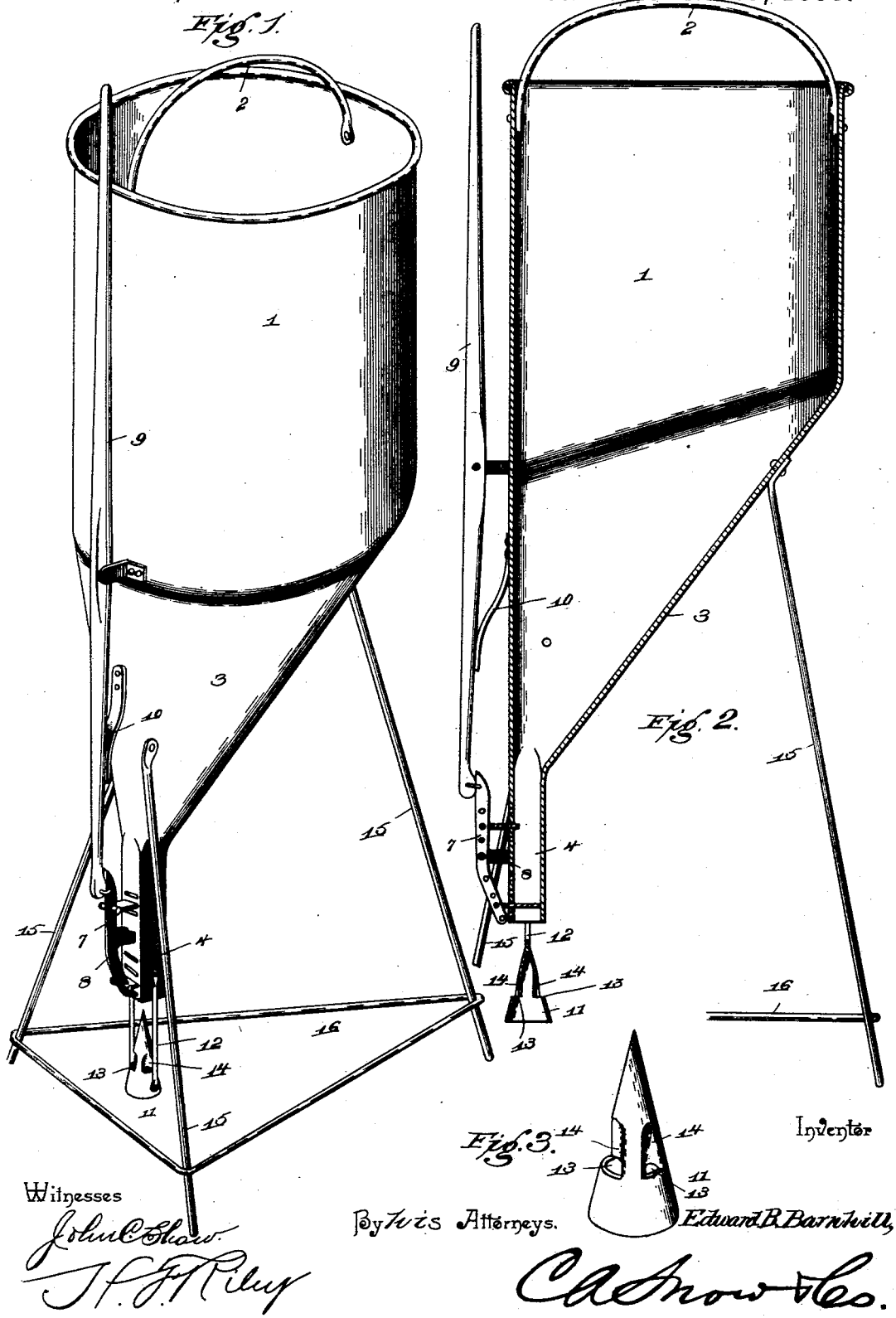

UNITED STATES PATENT OFFICE.

EDWARD B. BARNHILL, OF PROVIDENCE, KENTUCKY.

FERTILIZER-DISTRIBUTER.

SPECIFICATION forming part of Letters Patent No. 541,417, dated June 18, 1895.

Application filed March 28, 1895. Serial No. 543,556. (No model.)

*To all whom it may concern:*

Be it known that I, EDWARD B. BARNHILL, a citizen of the United States, residing at Providence, in the county of Webster and State of Kentucky, have invented a new and useful Fertilizer-Distributer, of which the following is a specification.

The invention relates to improvements in fertilizer distributers.

The object of the present invention is to improve the construction of fertilizer distributers, and to provide a simple and inexpensive one, which may be readily adjusted to drop the desired quantity of fertilizer, and which will properly scatter the same.

Another object of the invention is to provide a fertilizer distributer which can be conveniently operated by a person standing erect, and thereby avoid any strain on the operator due from assuming an unnatural position.

The invention consists in the construction and novel combination and arrangement of parts hereinafter fully described, illustrated in the accompanying drawings, and pointed out in the claims hereto appended.

In the drawings, Figure 1 is a perspective view of a fertilizer-distributer constructed in accordance with this invention. Fig. 2 is a central vertical sectional view of the same. Fig. 3 is a detail perspective view of the conical scattering device.

Like numerals of reference indicate corresponding parts in all the figures of the drawings.

1 designates a cylindrical hopper provided with a bail 2, and having a tapering lower portion 3, from which depends a contracted spout 4, preferably rectangular in cross-section. In the spout 4 are mounted upper and lower slide valves 5 and 6, connected at their outer ends by a lever 7, which is fulcrumed intermediate of its ends on a support 8. The lever is connected with the slide valves by removable pins, and is provided at its lower end with a series of perforations, for the reception of the lower pin, and the spout is provided at its lower and upper ends with a series of slots, for the reception of the lower and upper slide valves. By arranging the lower and upper slide valves in the different slots, the charge or quantity of fertilizer dropped may be readily regulated, as will be understood.

The valve mechanism is operated by a vertically disposed lever 9, fulcrumed intermediate of its ends on the exterior of the hopper, and having its lower end connected with the upper end of the lever 7, and the upper end of the operating lever 9 projects above the hopper, and is in convenient position for operation. A spring 10 is interposed between the lower portion of the operating lever and the conical portion of the hopper, and operates the whole, the upper valve thrown outward, and the lower valve arranged to close the spout, whereby a charge is dropped by moving the upper end of the operating lever outward. After a quantity of fertilizer has been dropped, the spring serves to return the parts to their initial position.

The fertilizer is properly scattered by a depending conical scattering device 11, located directly beneath the mouth of the spout and connected with the same by rods 12 secured to the spout and to the conical scattering device. The conical scattering device is open at the base, and is provided above the same with openings 13, and is grooved or bent in at 14, above the openings, and when a quantity of fertilizer is discharged from the spout, the conical scattering device serves to spread the fertilizer, and at the same time to permit a quantity of it, by passing through the openings 13, to fall directly beneath the same. By this construction, the fertilizer is properly scattered and distributed.

The fertilizer distributer may be operated when a person stands in an erect position, and it is provided with a stand comprising three legs 15, secured at their upper ends to the hopper, and diverging to form substantially a tripod support, and connected near their lower ends by a substantially triangular brace 16. The legs extend below the conical scattering device, and support the same above the ground and out of contact therewith, and when it is desired, the hopper may be placed on the ground, without danger of upsetting. The legs also serve to support the fertilizer distributer in operating, and render the distribution more certain and uniform.

It will be seen that the fertilizer distributer is exceedingly simple in its construction, that it may be conveniently operated, and that the quantity of fertilizer discharged may be regulated.

It will also be apparent that the operator is rested in his labor by supporting the fertilizer distributer on the ground from time to time.

Changes in the form, proportion, and the minor details of construction may be resorted to without departing from the principle or sacrificing any of the advantages of this invention.

What I claim is—

1. In a fertilizer distributer, the combination of a hopper having a discharge opening, valve mechanism for regulating the discharge of the contents of the hopper, and a conical scattering device arranged below the discharge opening and having an open base, and provided above the same with openings to permit the fertilizer to pass within and fall directly beneath the conical scattering device, substantially as described.

2. In a fertilizer distributer, the combination of a hopper provided with a depending discharge spout, valves mounted in the spout, means for operating the same, a conical scattering device having an open base and provided above the same with openings, and rods connecting the conical scattering device with the spout, substantially as described.

3. In a fertilizer distributer, the combination of a hopper having a discharge spout, valve mechanism, a scattering device suspended below the spout, and rods secured to the hopper and forming legs and supporting the scattering device above the ground, substantially as described.

4. A conical scattering device for fertilizer distributers and the like, having a closed top or apex and provided with an open bottom or base, and having at an intermediate point openings in its sides, whereby the material distributed is dropped directly beneath the base or bottom of the scattering device, substantially as described.

In testimony that I claim the foregoing as my own I have hereto affixed my signature in the presence of two witnesses.

EDWARD B. BARNHILL.

Witnesses:
J. A. WALLACE,
CARL DORRIS.